(12) United States Patent
Utsumi

(10) Patent No.: US 6,774,469 B2
(45) Date of Patent: Aug. 10, 2004

(54) SEMICONDUCTOR MEMORY CARD

(75) Inventor: Yoshimasa Utsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/268,524

(22) Filed: Oct. 10, 2002

(65) Prior Publication Data

US 2003/0052398 A1 Mar. 20, 2003

Related U.S. Application Data

(63) Continuation of application No. 09/553,813, filed on Apr. 21, 2000, now Pat. No. 6,501,163.

(30) Foreign Application Priority Data

Apr. 23, 1999 (JP) ............................................. 11-116428
Aug. 27, 1999 (JP) ............................................. 11-241542

(51) Int. Cl.[7] ............................................. H01L 23/02
(52) U.S. Cl. ...................................... 257/679; 257/680
(58) Field of Search ............................... 257/678, 679, 257/680, 787

(56) References Cited

U.S. PATENT DOCUMENTS

| | | | |
|---|---|---|---|
| 4,350,699 A | * | 9/1982 | Monnier et al. |
| 4,380,699 A | * | 4/1983 | Monnier et al. |
| 4,581,716 A | | 4/1986 | Kamiya |
| 4,649,418 A | * | 3/1987 | Uden |
| 5,184,209 A | * | 2/1993 | Kodai et al. |
| 5,244,840 A | * | 9/1993 | Kodai et al. |
| 5,272,374 A | | 12/1993 | Kodai et al. |
| 5,299,046 A | * | 3/1994 | Spaeth et al. |
| 5,430,366 A | * | 7/1995 | Watanbe |
| 5,455,785 A | | 10/1995 | Nazari |
| 5,736,782 A | * | 4/1998 | Schairer |
| 5,861,662 A | * | 1/1999 | Candelore |
| 5,877,547 A | * | 3/1999 | Rhelimi |
| 6,104,089 A | * | 8/2000 | Akram et al. |
| 6,262,915 B1 | * | 7/2001 | Kihara et al. |
| 6,402,039 B1 | * | 6/2002 | Freeman et al. |
| 6,567,291 B2 | * | 5/2003 | Iwasaki et al. |

FOREIGN PATENT DOCUMENTS

EP   0 692 771   1/1996

* cited by examiner

*Primary Examiner*—S. V. Clark
(74) *Attorney, Agent, or Firm*—Frommer Lawrence & Haug LLP; William S. Frommer

(57) ABSTRACT

A semiconductor memory card is disclosed which achieves augmentation in design property, promotion of understanding and augmentation in identification facility of the type thereof. A memory card housing is entirely or partially transparent or translucent so that a circuit board, a memory chip and so forth in the inside thereof can be visually observed from the outside therethrough. Or, the card housing is partially opaque or is colored at the transparent or translucent portion thereof. Or else, the card housings of different types of memory cards are formed as different ones of transparent, translucent and opaque housings from each other.

2 Claims, 9 Drawing Sheets

FIG. 9

EXAMPLES OF COMBINATION

| | MEMORY CARD READY FOR COPYRIGHT | MEMORY CARD NOT READY FOR COPYRIGHT |
|---|---|---|
| EXAMPLE 1 | TRANSPARENT | OPAQUE |
| EXAMPLE 2 | OPAQUE | TRANSPARENT |
| EXAMPLE 3 | TRANSLUCENT | TRANSPARENT |
| EXAMPLE 4 | TRANSPARENT | TRANSLUCENT |
| EXAMPLE 5 | TRANSLUCENT | OPAQUE |
| EXAMPLE 6 | OPAQUE | TRANSLUCENT | ns
SEMICONDUCTOR MEMORY CARD

This application is a continuation of U.S. application Ser. No. 09/553,813, filed Apr. 21, 2000, now U.S. Pat. No. 6,501,163.

BACKGROUND OF THE INVENTION

This invention relates to a semiconductor memory card which employs a non-volatile memory as a storage medium.

In recent years, a memory card of a small size which employs a non-volatile memory such as, for example, a flash memory as a storage element has been developed.

Into and from the memory card, various kinds of information can be written and read out using, for example, a drive apparatus for exclusive use or an audio/video apparatus or an information apparatus in which a drive apparatus is incorporated.

Also memory cards capable of storing still image data picked up, for example, by a digital still camera having a built-in drive apparatus or recording computer data, moving picture data, music data, voice data or the like have been developed.

A drive apparatus particularly for such memory cards as described above does not require such a complicated construction as is required for a disk-type recording medium or a tape-type recording medium such as, for example, a rotating or feeding mechanism, a head mechanism and a servo system and besides is superior in terms of the accessibility and the writing/reading speed. The drive apparatus thus allows realization of low cost, low power consumption and miniaturization/reduction in thickness, and consequently, it can be incorporated readily into various apparatus. From such circumstances as described above, a semiconductor memory card is being developed as a very useful storage medium.

Meanwhile, in some of disk media or tape media which have been popularized already, a medium as a disk or a tape is accommodated in a cartridge such as, for example, a mini disk (MD, trademark), a floppy disk, a cassette tape or a DAT (digital audio tape).

In some of such cartridges, a housing is partially transparent or translucent so that the disk or the tape inside can be visually observed.

With a cartridge of the type just described, a user can see an internal structure and visually observe a manner of the tape or the disk, or can enjoy the design.

However, with regard to a semiconductor memory card, since it does not particularly have a dynamic recording medium such as a disk or a tape built therein or from some other circumstances, an opaque card housing is used.

The opaque card housing, however, makes it difficult for common users to recognize the structure of the semiconductor memory card and particularly makes it difficult to understand differences of the semiconductor memory from a disk or a tape as a storage medium. Further, the opaque card housing is sometimes less liable to attract the interest of the user in the design.

On the other hand, as a semiconductor memory card allows realization of recording and reproduction of music or video data, it is required to realize copyright protection such as to prevent illegal copying of data and so forth.

Thus, also a memory card has been proposed wherein a signal processing circuit for authentication processing or encryption processing is incorporated so that predetermined authentication processing or encryption may be performed in order to prevent illegal copying.

However, where a memory card is applied to record speech or video data, copyright protection is not required in some cases. For example, where a memory card is applied to recording of aural speech at a conference or to memorandum recording of its user, copyright protection is not required. Accordingly, in such an instance as just described, preferably a memory card which does not incorporate a signal processing circuit for copyright protection is used.

From such a situation as described above, two types of semiconductor memory cards are available including a semiconductor memory card wherein a signal processing circuit for copyright protection processing is accommodated in a card housing and the other semiconductor memory card wherein such a signal processing circuit as mentioned above is not accommodated in a card housing. Thus, it is the existing state of things that, for example, a recording and reproduction apparatus ready for a memory card allows loading of both of the two types of semiconductor memory cards.

In such a situation as just described, a user must selectively use the memory cards in accordance with an object of use. However, the two kinds of memory cards which are same or substantially same in outer profile and size in order to keep the compatibility cannot be identified readily from each other and cannot be selectively used well by the user.

SUMMARY OF THE INVENTION

It is an object of the present invention to provide a semiconductor memory card which realizes attraction of the interest of a user to the design and allows visual observation of an internal structure thereof.

It is another object of the present invention to provide a semiconductor memory card which augments identification of the type thereof by a user where two different types of semiconductor memory cards are available.

In order to attain the objects described above, according to an aspect of the present invention, there is provided a semiconductor memory card, comprising a card housing, and a circuit board arranged in the card housing and having a non-volatile memory mounted thereon, the card housing being entirely or partially transparent or translucent. From a circumstance regarding the design or the function, the card housing may be partially opaque.

The transparent or translucent portion of the card housing may be colored.

With the semiconductor memory card, since the card housing is entirely or partially transparent or translucent and the circuit board, memory chip and so on arranged in the card housing can be visually observed from the outside of the card housing through the card housing, semiconductor memory cards which are various and interesting in design can be provided advantageously. Further, since the internal construction of the semiconductor memory card can be visually observed from the outside of the card housing, the user can recognize that a semiconductor memory card is quite different from a disk medium or a tape medium and can augment the understanding thereof regarding the semiconductor memory card, and consequently, the user can deeply understand advantages, various forms of use, handling and so forth of the memory card.

Where the card housing is partially opaque, the diversity in design can be expanded.

Further, where the transparent or translucent portion of the card housing is colored, augmentation in visual interest and diversity in design can be further increased, and putting of memory cards in order or selective use of memory cards is facilitated.

According to another aspect of the present invention, there are provided semiconductor memory cards one of which is a first semiconductor memory card including a card housing and signal processing means arranged in the card housing for performing processing for copyright protection and the other one of which is a second semiconductor memory card including a card housing in which signal processing means for performing processing for copyright protection is not arranged, the card housing of the semiconductor memory card being entirely or partially translucent where the semiconductor memory card is one of the first and second semiconductor memory cards whereas the card housing of the semiconductor memory card is entirely or partially opaque where the semiconductor memory card is the other of the first and second semiconductor memory cards. Alternatively, the card housing of the semiconductor memory card may be entirely or partially transparent where the semiconductor memory card is one of the first and second semiconductor memory cards whereas the card housing of the semiconductor memory card is entirely or partially translucent where the semiconductor memory card is the other of the first and second semiconductor memory cards. Further alternatively, the card housing of the semiconductor memory card may be entirely or partially transparent where the semiconductor memory card is one of the first and second semiconductor memory cards whereas the card housing of the semiconductor memory card is entirely or partially opaque where the semiconductor memory card is the other of the first and second semiconductor memory cards.

In short, the card housings are made different between different ones of transparent, translucent and opaque card housings so that, when a memory card is given, it can be discriminated which one of the first and second semiconductor memory cards the memory card is.

Consequently, when a memory card is given, the user can discriminate at a glance whether the memory card is the first semiconductor memory card or the second semiconductor memory card depending upon whether the card housing of the memory card is transparent, translucent or opaque. Accordingly, the user can selectively use a semiconductor memory card appropriately in accordance with an application of the memory card or the type of a recording and/or reproduction apparatus.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 9 is a diagrammatic view illustrating an example of settings of a card housing of the memory card of FIG. 1.

DETAILED DESCRIPTION OF THE PREFERRED EMBODIMENT

In the following, the description of the preferred embodiments according to the present invention will be described below.

Firstly, a semiconductor memory card to which the present invention is applied and modifications to it are described below with reference to FIGS. 1 to 5.

Figure 1:
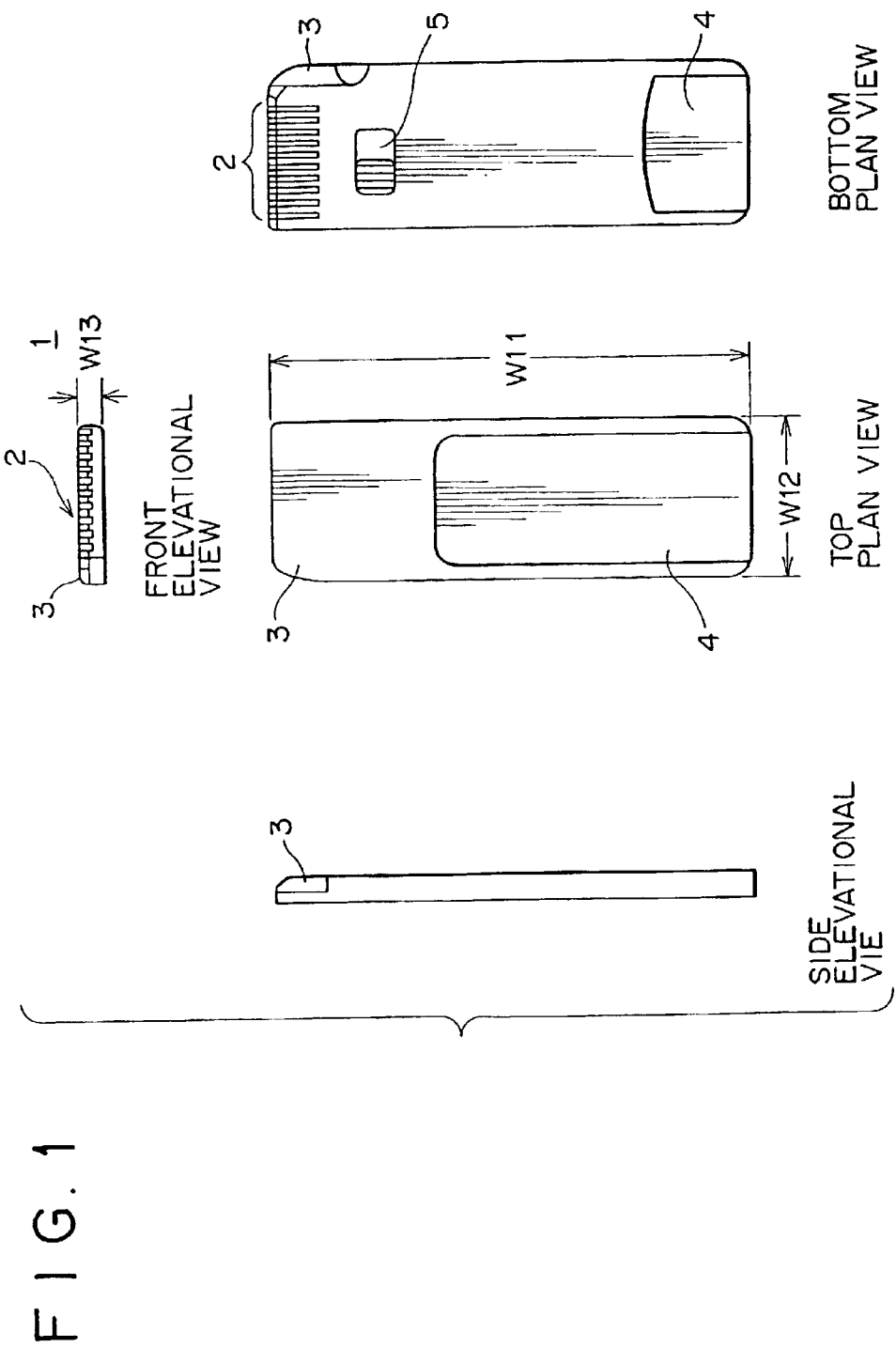
FIG. 1 is a top plan view, a front elevational view, a side elevational view and a bottom plan view showing a memory card to which the present invention is applied.
Figure 2:
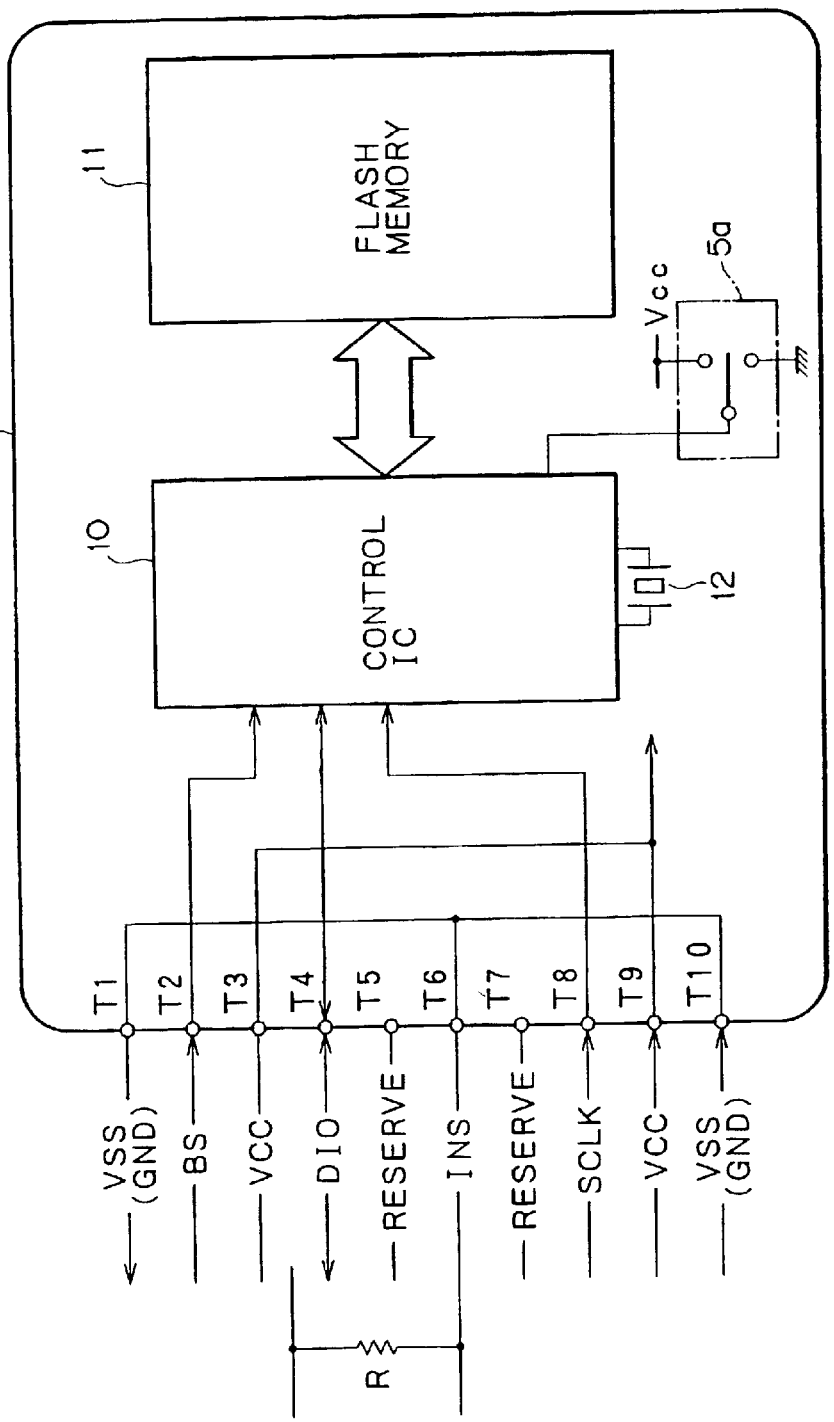
FIG. 2 is a diagrammatic view showing an internal structure of the memory card of FIG. 1.

FIGS. 1 and 2 show an outer profile and an internal structure of a semiconductor memory card (hereinafter referred to simply as memory card) 1 to which the present invention is applied. It is to be noted that, while the memory card 1 of the present embodiment has a card housing which is entirely or partially transparent or opaque, in order to easily understand the outer profile of the card housing, the internal structure which can be visually observed from the outside is not shown in FIG. 1.

The outer profile of the memory card 1 is provided, for example, by a plate-shaped card housing as shown in FIG. 1. The memory card 1 includes, for example, a semiconductor memory element of a predetermined capacity provided inside the card housing. In the present embodiment, a flash memory is used as the semiconductor memory element.

The housing whose top plan view, front elevational view, side elevational view and bottom plan view are shown in FIG. 1 is formed, for example, by molding of a plastics material. As a particular example of the size of the housing, the dimensions W11, W12 and W13 indicated in FIG. 1 are W11=60 mm, W12=20 mm, and W13=2.8 mm.

A terminal section 2 having, for example, 10 electrodes is formed on a portion of the housing extending from a lower portion of the front face to the bottom face side so that reading out from and writing into the memory element in the housing may be performed through the terminal section 2.

A recessed portion 3 is formed at a left upper corner portion in a plane of the housing. The recessed portion 3 is provided to prevent the memory card 1 from being inserted in a wrong direction, for example, when the memory card 1 is loaded into a loading mechanism of a drive apparatus side.

A label adhesion face 4 is formed on the housing such that it extends from the top face to the bottom face such that a label on which contents stored in the memory card 1 are written may be adhered to the label adhesion face 4.

Further, a slide switch 5 for preventing erroneous erasure of recorded contents of the memory card 1 is provided on the bottom face of the housing.

In the memory card 1 described above, the capacity of the flash memory is prescribed to be one of 4 MB (megabytes), 8 MB, 16 MB, 32 MB, 64 MB and 128 MB.

Further, the FAT (File Allocation Table) system is used as a file system for data recording/reproduction.

The writing speed is prescribed to be 1,500 KByte/sec to 330 KByte/sec and the reading speed is prescribed to be 2.45 MByte/sec. Further, the write unit is 512 bytes, and the erasure block size is 8 KB or 16 KB.

Further, the power supply voltage Vcc is prescribed to be 2.7 to 3.6 V, and the serial clock SCLK is prescribed to be maximum 20 MHz.

FIG. 2 shows the electrode structure of the terminal section 2 and an internal circuit construction of the memory card 1. Referring to FIG. 2, the terminal section 2 has such a structure that it includes 10 plane electrodes T1 to T10 arranged in a row as can be seen also from FIG. 1. The electrodes T1 to T10 are such as follows.

The terminals T1 and T10 are detection voltage Vss terminals (ground lines GND).

The terminal T2 is an input terminal of a serial protocol bus state signal BS.

The terminals T3 and T9 are power supply voltage Vcc terminals.

The terminal T4 is a data terminal, that is, an input/output terminal of a serial protocol data signal.

The terminals T5 and T7 are reserved.

The terminal T6 is a detection terminal and used for detection of loading of the memory card by a drive apparatus.

The terminal T8 is an input terminal of the serial clock SCLK.

A control IC 10, a flash memory 11, a quartz oscillator 12 and a switch 5a are arranged inside the memory card 1.

The control IC 10 executes writing/reading out operation into/from the flash memory 11.

As can be seen from FIG. 2, a serial protocol bus state signal BS from the terminal T2 and a serial clock SCLK from the terminal T8 are supplied to the control IC 10. Upon writing operation, the control IC 10 performs writing of data supplied thereto from the terminal T4 into the flash memory 11 in accordance with the serial protocol bus state signal BS and the serial clock SCLK. Upon reading out operation, the control IC 10 reads out data from the flash memory 11 in accordance with the serial protocol bus state signal BS and the serial clock SCLK and outputs the data to the drive apparatus side not shown through the terminal T4.

The detection voltage Vss is supplied to the detection terminal T6, and the drive apparatus side detects the terminal voltage at the detection terminal T6 by means of a resistor R as seen in FIG. 2 to detect whether or not the memory card 1 is connected to a loading section (connector which is hereinafter described).

The switch 5a is operated to open or close by the slide switch 5. The control IC 10 sets write enable/disable in response to the open or closed state of the switch 5a.

The control IC 10 acquires a required internal clock from an output of the quartz oscillator 12.

An actual appearance of the memory card 1 of the present embodiment described hereinabove with reference to FIGS. 1 and 2 is shown in perspective view in FIG. 3.

Figure 3:
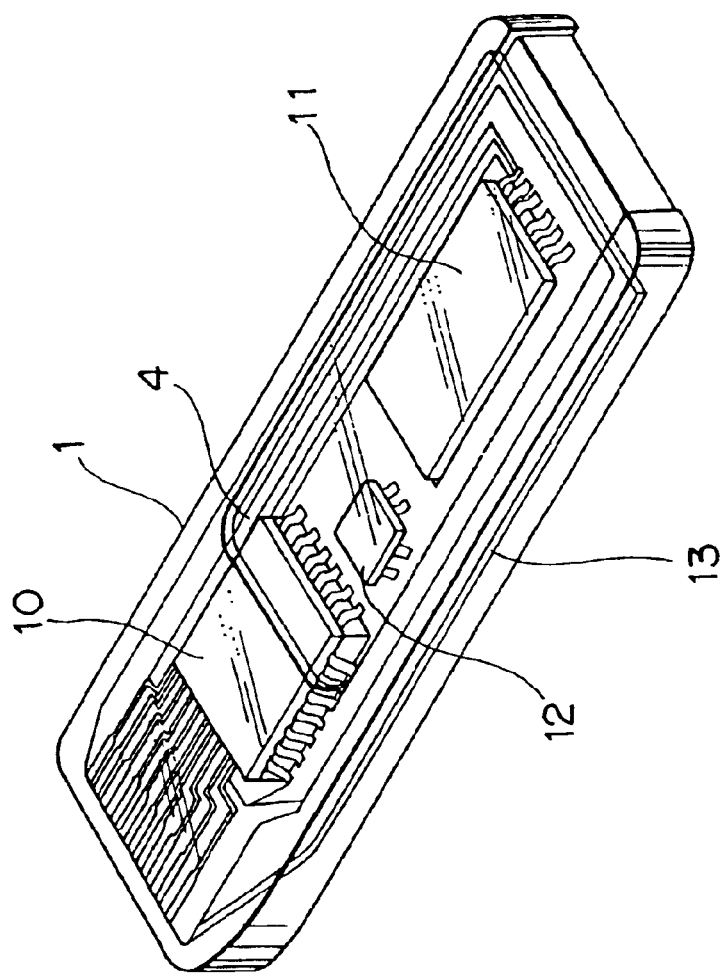
FIG. 3 is a perspective view showing an appearance of the memory card of FIG. 1.

As can be seen from FIG. 3, the card housing of the memory card 1 is entirely formed from a transparent resin. For example, the card housing is formed transparent from an ABS (acrylonitrile-butadiene-styrene copolymer resin), styrene or polycarbonate.

Consequently, such an internal structure as described above can be visually observed from the outside through the card housing.

In particular, a circuit board 13, and the control IC 10, flash memory 11 and quartz oscillator 12 disposed on the circuit board 13 can be visually observed from the top face side of the memory card 1 through the card housing. Further, though not shown, a printed circuit pattern, a location of the slide switch 5 and so forth on the circuit board 13 can be visually observed from the bottom face side of the memory card 1 through the card housing.

Since the card housing is formed transparent and the user can visually observe the internal structure of the memory card 1 in this manner, the memory card 1 is interesting in design to and expands the pleasure of the user.

Further, the user can know that a semiconductor memory (the flash memory 11) and so forth are incorporated inside the memory card 1 and can recognize at a glance that the semiconductor memory is a medium totally different from, for example, a disk or a tape. Further, since the understanding of the user is expanded, advantages, various forms of use and so forth of the memory card can be penetrated popularly.

It is to be noted that various modulations can be made to the memory card described above, and such modifications are described below.

First, while the card housing of the memory card 1 of FIG. 3 is transparent in its entirety, it is also possible to make part of the card housing transparent and make the remaining part opaque.

Figure 4:
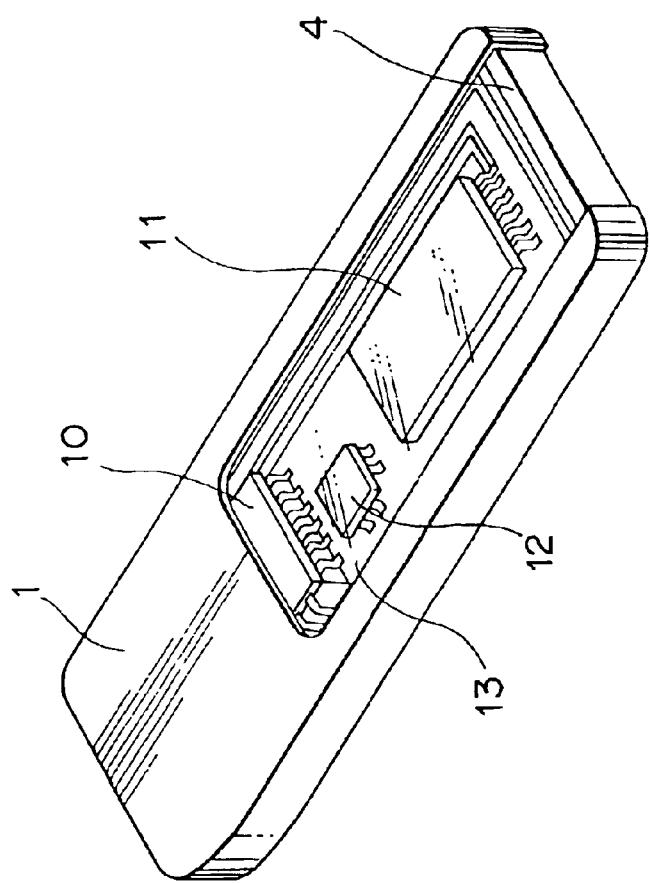
FIG. 4 is a perspective view showing an appearance of another memory card to which the present invention is applied.

For example, in another memory card 1 shown in FIG. 4, only the label adhesion face 4 of the card housing is transparent, and the remaining part of the card housing is opaque.

Where the card housing just described is used, the effect of augmentation in such interest in design to and understanding of the user regarding the internal construction can be achieved, and, for example, a user who does not like the design of the card housing in that the internal construction can be visually observed may apply a label to the card housing to make the card housing more favorable to the user.

Figure 5:
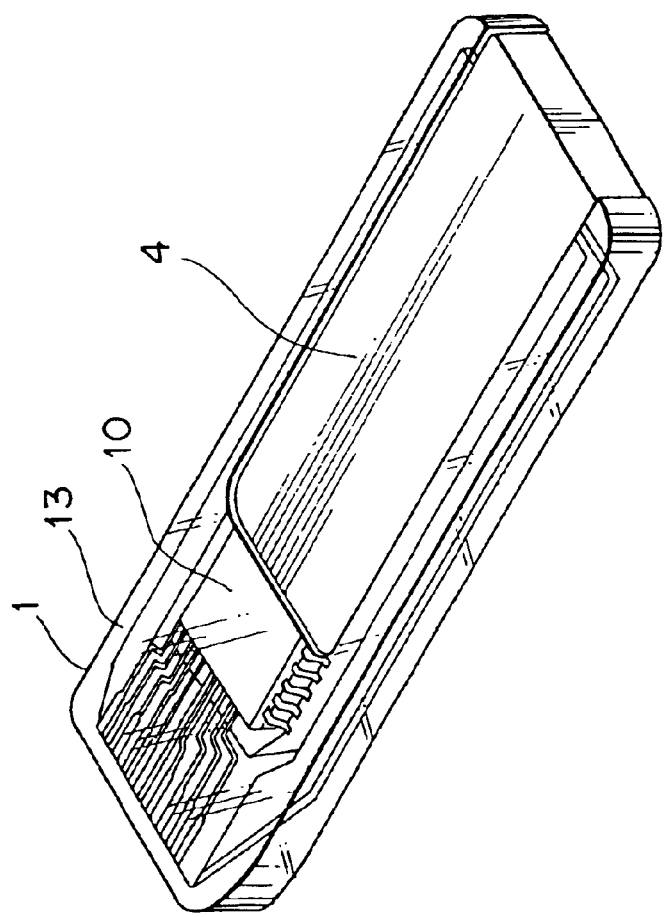
FIG. 5 is a similar view but showing an appearance of a further memory card to which the present invention is applied.

FIG. 5 shows a further memory card 1 wherein only the label adhesion face 4 is opaque while the remaining part of the card housing is transparent conversely to the memory card 1 described hereinabove with reference to FIG. 4.

In the memory card 1 shown in FIG. 5, irrespective of whether or not a label is applied to the label adhesion face 4, the transparent portion of the card housing is kept constant. Consequently, the effect in design provided by the transparent housing can be kept constant.

Naturally, where the memory card 1 has both of a transparent portion and an opaque portion, also it is possible to select the position of the transparent portion in other various manners.

For example, also it is possible to make only the top face side transparent, make only the bottom face side transparent or make only a side face of the side faces transparent.

Further, while it is described in the description of the memory cards of the embodiment and the modifications above that the card housing is entirely or partially transparent, the portions which are described to be transparent above may alternatively be translucent.

Further, the portions need not be colorless and transparent or colorless and translucent, but may be colored and transparent or colored and translucent.

For example, where the portions described above are made transparent and colored with various colors such as red or blue as generally called skeleton color, see-through color or translucent color, the interest in design is augmented significantly.

Further, where memory cards 1 of various skeleton colors are provided, a user can purchase one of the memory card 1 in accordance with its favor or additionally purchase another one of the memory cards 1 of a different color and selectively use the memory cards 1 separately for separate objects of use or for different genres. In this instance, the user can put the memory cards in order readily.

Particularly, the memory card 1 can be suitably applied to multi-media systems in recent years and is estimated to be used to store various types of information such as music, video and data files and so forth. Accordingly, it is very convenient to the user to selectively use or put different memory cards in order in accordance with different colors.

Naturally, the maker side may provide memory cards in different colors for different objects of use.

Also it may be possible to use several colors for a memory card. For example, the memory card 1 may be formed such that the card housing is colored with rainbow colors but allows visual observation of the inside of the memory card 1 therethrough.

Furthermore, while a transparent portion, a translucent portion, a colored and transparent portion and a colored and translucent portion may be provided as described above, the memory card 1 which has such portions in a mixed condition may be formed.

Also it may be possible, for example, to form the card housing such that the name of an IC chip therein may be indicated thereon in order to promote understanding of the user regarding the internal construction. For example, if an indication of "8 Mbyte flash memory" is provided on a portion of the top wall of the housing just above the flash memory 11 such that the memory chip can be seen just below the indication, then this helps understanding of the internal structure or the performance of the memory card 1 to the user.

Further, the semiconductor memory card of the present invention can be applied not only as a memory card having such a shape as that of the memory card 1 described hereinabove but also as a semiconductor memory card of any shape such as, for example, a memory card of the name card size.

Naturally, the internal structure, storage capacity, subject of use, contents of data to be stored and so forth of the semiconductor memory card can be applied not only to the specific memory cards described hereinabove but also to any other memory card.

Subsequently, another semiconductor memory card to which the present invention is applied and modifications to it are described below with reference to FIGS. 6 to 9.

The memory card of the present embodiment basically has an internal construction similar to that of the memory card 1 described hereinabove with reference to FIGS. 1 to 5. However, in order to allow, where two types of memory cards including a memory card which incorporates a signal processing circuit for copyright protection and the other memory card which does not incorporate such a signal processing circuit as just mentioned are available, a user to make identifications between the two types of the memory cards readily, the housing of the memory card of the present embodiment is formed in accordance with the type of the memory card. In particular, a memory card type is indicated by whether the housing is transparent, translucent or opaque.

Here, a construction of a recording and reproduction apparatus ready for the memory card of the present embodiment, constructions of the two kinds of memory cards and recording and reproduction operations for the memory cards are described successively.

Figure 6:
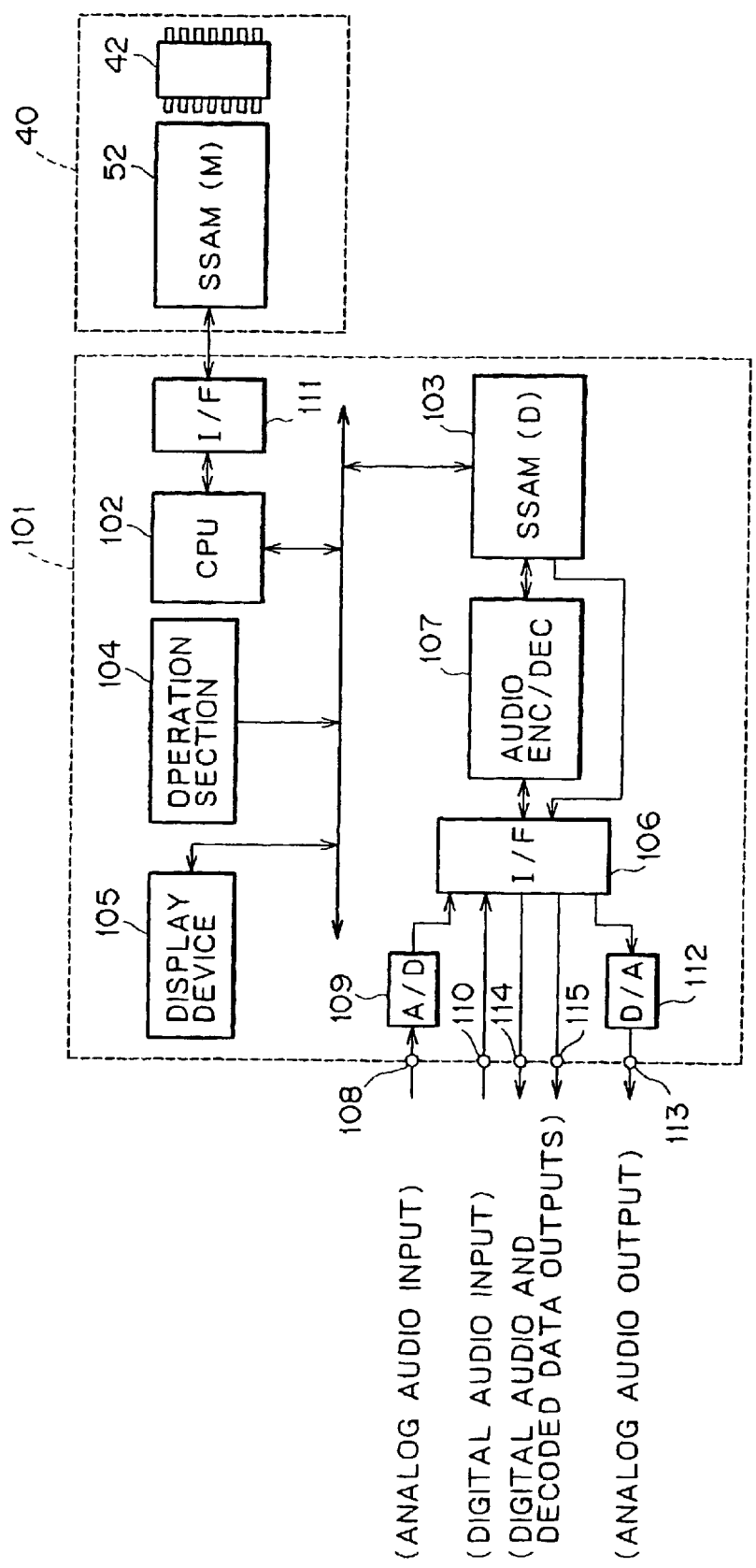
FIG. 6 is a block diagram of a recorder in which the memory card of FIG. 1 can be used.

FIG. 6 shows constructions of a recording and reproduction apparatus (hereinafter referred to as recorder 101) in which the memory card of the present embodiment is used as a recording medium and a memory card 40 of the present embodiment.

Referring to FIG. 6, the recorder 101 performs recording and reproduction of a digital audio signal or the like into and from the memory card 40 which has a built-in flash memory. It is to be noted, however, that a recording and reproduction system which is based on the recorder 101 and the memory card 40 can execute recording/reproduction also of moving picture data, still picture data and so forth other than a digital audio signal.

In FIG. 6, the constructions of the recorder 101 and the memory card 40 are individually shown as blocks indicated by broken lines. The memory card 40 is removably loaded into the recorder 101. It is to be noted that the memory card 40 is a memory card in which a signal processing circuit (security block 52) for copyright protection is incorporated, and the other memory card in which a signal processing circuit for copyright protection is not incorporated is hereinafter described as a memory card 40'.

The recorder 101 includes a CPU 102, and a security block 103, an operation section 104 and a display device 105 connected to the CPU 102 by a bus.

The security block 103 includes an encryption circuit of the DES (Data Encryption Standard) system and a circuit for authentication processing.

The operation section 104 includes various keys, buttons, jog dials and so forth regarding recording and reproduction in order to allow the user to perform various operations.

Operation information such as a recording instruction or a reproduction instruction generated by the operation section 104 in response to an operation of the user is provided to the CPU 102 over the bus.

The display device 105 is formed, for example, from a liquid crystal display panel and displays thereon various kinds of information, an operation condition of the recorder 101 and so forth under the control of the CPU 102.

The recorder 101 further includes an audio interface 106, an encoder/decoder 107, an A/D converter 109, and a D/A converter 112.

The audio interface 106 performs interface processing of audio data between an external input/output and the encoder/decoder 107 inside the recorder 101.

The encoder/decoder 107 performs high-efficiency coding of a digital audio signal and decoding of high-efficiency coded data.

For the high-efficiency coding, an improved method of the ATRAC (Adaptive Transform Acoustic Coding) adopted in a mini disc system can be adopted. The improved method mentioned is hereinafter referred to as ATRAC3. In the ATRAC3, audio data of 16 bits per one sample sampled with 44.1 kHz are processed. The minimum data unit when audio data are processed by the ATRAC3 is a sound unit (SU). One SU is data of several hundreds bytes obtained by compressing data for 1,024 samples (1,024×16 bits×2 channels) and corresponds approximately to 2.3 milliseconds in time. By the ATRAC3, audio data are compressed to approximately 1/10 in data amount. However, such compression/decompression processing little deteriorates the sound quality.

If an analog audio signal as an output of an external audio outputting apparatus such as, for example, a reproduction output of a CD player or a MD (mini disc) player, an output of a tuner or a reproduction output of a tape player is supplied to the recorder 101, then the analog audio signal is supplied from the terminal 108 to the A/D converter 109, by which it is converted into a digital audio signal, and the digital audio signal is supplied to the audio interface 106.

On the other hand, if a digital audio signal, for example, as a reproduction output of an external audio outputting apparatus, reproduction data of a digital broadcast, audio data distributed over a network or the like is supplied similarly to the recorder 101, then the digital audio signal is supplied from a terminal 110 to the audio interface 106. The digital audio signal is transmitted from the external apparatus to the recorder 101, for example, over an optical cable.

The audio interface 106 performs selection processing for the audio signals inputted thereto in such a manner as described above and supplies the selected audio signal to the encoder/decoder 107.

The encoder/decoder 107 performs the aforementioned high-efficiency coding processing for a digital audio signal supplied thereto and supplies resulting coded data to the security block 103.

The security block 103 encrypts the coded data supplied thereto.

The security block 103 and the security block 52 in the memory card 40 which is hereinafter described are provided for protection of the copyright of contents (here, a digital audio signal), and the security block 103 of the recorder 101 has a plurality of master keys and storage keys unique to individual apparatus. The security block 103 can thus perform encryption and decryption processing using the keys.

Further, the security block 103 has a random number generation circuit for generating a session key. If the memory card 40 in which the security block 52 is built is loaded into the recorder 101, then the security block 103 performs authentication of confirming whether or not the memory card 40 loaded is real. If the security block 103 succeeds in the authentication, then it can share a session key with the security block 52.

Each of the security blocks 103 and 52 has a function of individually performing predetermined authentication processing.

Although details are hereinafter described, the memory card 40 includes a flash memory 42 (non-volatile memory), a security block 52 including a DES encryption circuit, a communication interface, a register and so forth, which are formed on a chip as an IC.

The memory card 40 is removably loaded into the recorder 101. It is to be noted that the recorder 101 in the present system allows use of a memory card which does not have an encryption function, that is, a memory card 40' having no security block, which is hereinafter described.

Audio data which have been inputted and then undergone high-efficiency coding processing by the encoder/decoder 107 and encryption processing by the security block 103 as described above are supplied to the CPU 102.

The CPU 102 communicates with the memory card 40 loaded in the loading mechanism not shown through a memory interface 111. It is to be noted that serial communication is performed between the CPU 102 and the memory card 40 through the memory interface 111.

The CPU 102 supplies audio data, for which encryption processing has been performed by the security block 103, to the memory card 40 through the memory interface 111 so that the audio data are written into the flash memory 42.

The inputted audio signal is recorded into the memory card 40 along the route described above.

In order to reproduce the audio data recorded in the memory card 40, the CPU 102 controls the flash memory 42 to read out audio data and transfer the audio data and fetches the transferred data through the memory interface 111. Then, the CPU 102 supplies the read out audio data, that is, encrypted audio data, to the security block 103 so that the security block 103 executes decoding as decryption. Further, the CPU 102 controls the encoder/decoder 107 to execute decoding processing corresponding to the compression processing for the decrypted audio data.

By the decoding processing of the encoder/decoder 107, an audio signal in the form of data of 16 bits per one sample sampled with 44.1 kHz is obtained. The audio signal is supplied through the audio interface 106 to the D/A converter 112, by which it is converted into an analog audio signal. The analog audio signal is outputted from a terminal 113 to an external apparatus.

Or, the audio data from the encoder/decoder 107 and the decoded data from the security block 103 are outputted as digital data from terminals 114 and 115 through the audio interface 106 to external apparatus, respectively.

It is to be noted that, while, in the foregoing description, encryption upon recording of audio data into the memory card 40 and decryption upon reproduction from the memory card 40 are performed by the security block 103 of the recorder 101 side, they may alternatively be performed by the security block 52 in the memory card 1.

Otherwise, encryption upon recording may be performed by the security block 103 whereas decryption upon reproduction is performed by the security block 52, or alternatively, encryption upon recording may be performed by the security block 52 whereas decryption upon reproduction is performed by the security block 103 conversely.

Further, encryption upon recording may be performed doubly by the security block 103 and the security block 52 whereas decryption upon reproduction is performed by the security block 52 and the security block 103.

The security blocks 103 and 52 have similar encryption functions to each other so that an arbitrary method for encryption and decryption can be realized by setting of sharing, communication or the like of a key for encryption and decryption.

Further, the security blocks 103 and 52 have an authentication function in addition to the encryption and decryption function. Thus, when the memory card 40 is loaded into the recorder 101, communication of authentication data is performed between the security block 103 and the security block 52, and each of the security block 103 and the security block 52 discriminates based on a result of the data communication whether the authentication is OK or NG. In this instance, such a processing method can be realized that, for example, if the authentication is NG, then the recorder 101 is inhibited from executing a recording/reproduction operation for the memory card 40.

In a detailed method of the authentication processing, the recorder 101 side transmits certain first authentication data held in the security block 103 to the memory card 40 side. The security block 52 of the memory card 40 generates corresponding second authentication data in accordance with a method determined in advance for the first authentication data received from the recorder 101 side, adds the second authentication data to the first authentication data and transmits resulting data to the recorder 101 side.

In the recorder 101 side, the CPU 102 can discriminate whether or not the authentication is OK or NG by supervising whether or not second authentication data corresponding properly to the first authentication data are received from the memory card 40.

Figure 7:
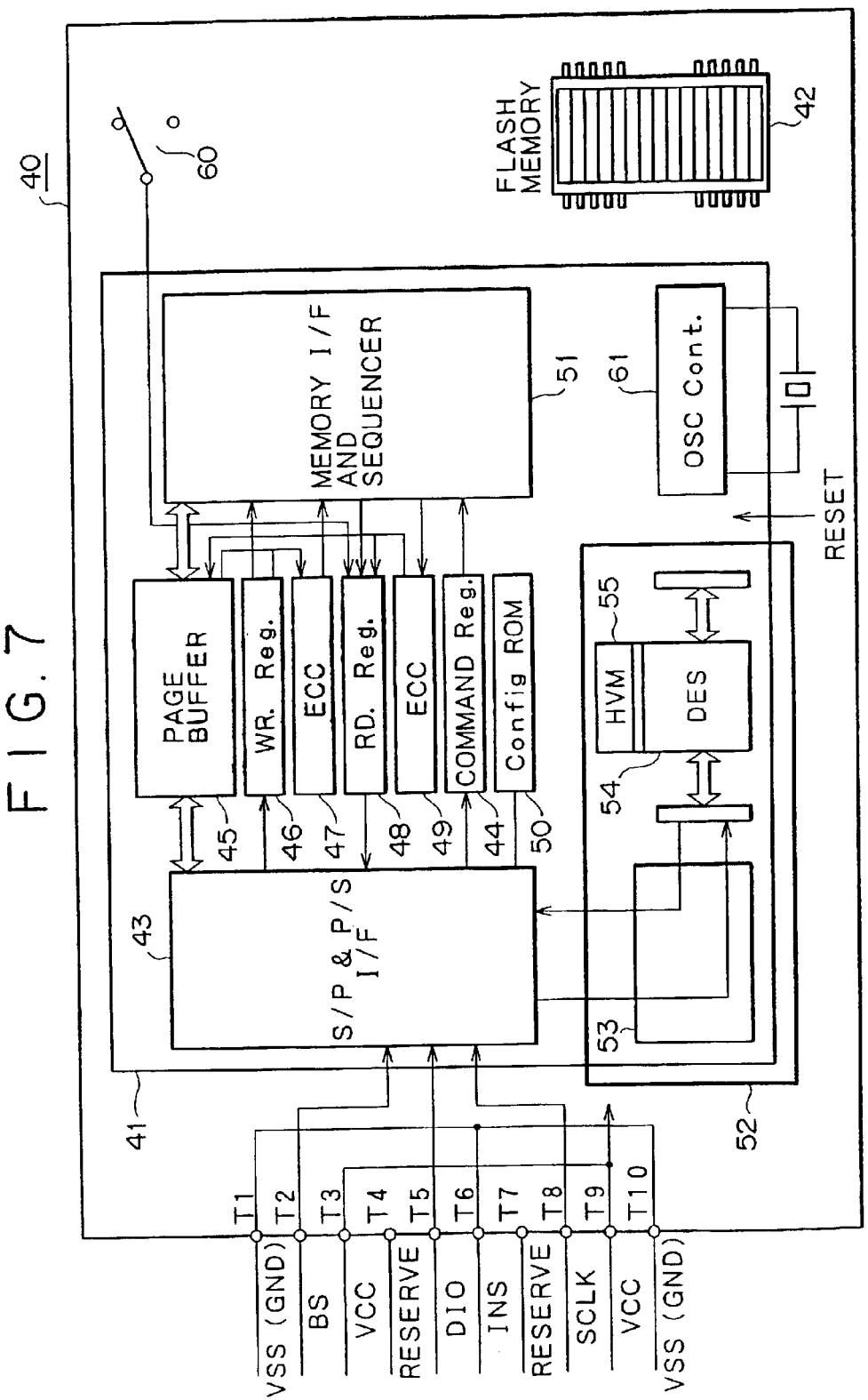
FIG. 7 is a block diagram of the memory card of FIG. 1 where it is ready for copyright protection.

The authentication function and the encryption and decryption functions are provided for copyright protection as described hereinabove FIG. 7 shows the construction of the memory card 40.

Referring to FIG. 7, the memory card 40 shown includes a control block 41 and a flash memory 42 which are formed as a one-chip IC.

In particular, the memory card 40 is basically similar to the memory card 1 described hereinabove with reference to FIG. 2, and FIG. 7 shows a construction of the memory card 40 which is ready for copyright protection.

A bidirectional serial interface (memory interface 111) between the CPU 102 of the recorder 101 and the memory card 40 is composed of 10 signal lines connected to terminals T1 to T10.

The signal lines are such as those described hereinabove with reference to FIG. 2.

Further, the control block 41 and the flash memory 42 are provided inside the memory card 40. The control block 41 and the flash memory 42 correspond to the control IC 10 and the flash memory 11 of FIG. 2, respectively.

A serial/parallel conversion, parallel/serial conversion and interface block (hereinafter referred to simply as S/P, P/S and IF block) 43 of the control block 41 is an interface between the memory interface 111 of the recorder 101 and the control block 41.

The S/P, P/S and IF block 43 performs processing of converting serial data received from the recorder 101 into parallel data and fetching the parallel data into the control block 41, and converting parallel data from the control block 41 into serial data and sending the serial data to the recorder 101.

Further, the S/P, P/S and IF block 43 classifies, when it receives a command and data transmitted thereto over a data line DIO, the command and data into a command and data for ordinary accessing to the flash memory 42 or a command and data which require encryption.

In particular, in a signal format transmitted over the data line DIO, a command is transmitted first and then data are transmitted. Therefore, the S/P, P/S and IF block 43 checks the code of the command and discriminates whether the command and the data are a command and data necessary for ordinary accessing or a command and data which require encryption.

In accordance with a result of the discrimination, the command necessary for ordinary accessing is stored into a command register 44, and the data are stored into a page buffer 45 and a write register 46.

An error correction coding circuit 47 is provided in association with the write register 46. The error correction coding circuit 47 produces a redundant code of an error correction code for data temporarily stored in the page buffer 45.

Output data of the command register 44, page buffer 45, write register 46 and error correction coding circuit 47 are supplied to a flash memory interface and sequencer (hereinafter referred to simply as memory IF and sequencer) 51.

The memory IF and sequencer 51 is an interface between the control block 41 and the flash memory 42 and controls communication of data between them. Data are written into the flash memory 42 through the memory IF and sequencer 51.

Upon reading out of data, data read out from the flash memory 42 are supplied to the page buffer 45, read register 48 and error correction circuit 49 through the memory IF and sequencer 51.

Data stored in the page buffer 45 are subject to error correction by the error correction circuit 49. An output of the page buffer 45 after such error correction and an output of the read register 48 are supplied to the S/P, P/S and IF block 43 and then supplied to the CPU 102 of the recorder 101 through the serial interface described hereinabove.

It is to be noted that a configuration ROM 50 is a member in which version information of the memory card 40, various attribute information and so forth are stored.

Further, the memory card 40 includes a switch 60 for prevention of erroneous erasure which can be operated by the user when necessary. When the switch 60 is in a connection state for inhibition of erasure, even if a command for instruction to erase data in the flash memory 42 is received from the recorder 101 side, erasure of the flash memory 42 is inhibited.

An oscillator 61 is a member for generating a clock which serves as a timing reference for processing of the memory card 40.

As described hereinabove, for the object of copyright protection, authentication processing and encryption of contents to be written into the flash memory 42 (audio data compressed in accordance with the ATRAC3, hereinafter referred to as ATRAC3 data) are performed by the security block 103 of the recorder 101 and the security block 52 of the memory card 40.

The security block 52 includes a buffer memory 53, a DES encryption circuit 54, a non-volatile memory 55 and so forth.

The security block 52 has a plurality of authentication keys and a storage key which is unique for each memory card.

The non-volatile memory 55 stores a key necessary for encryption and cannot be accessed (read out) from the outside. For example, a storage key is stored in the non-volatile memory 55.

Further, the memory card 40 includes a random number generation circuit and can authenticate correctly with the recorder 101 for exclusive use (this signifies that the recorder 101 belongs to the system in which a predetermined data format or the like is used commonly) and can share a session key.

A contents key for encrypting ATRAC3 data is encrypted with the session key and communicated between the recorder 101 and the memory card 40.

Similarly to the security block 52 of the memory card 40, also the security block 103 of the recorder 101 has a storage key unique to the set. For example, when encrypted contents are to be moved, the contents key is re-applied using the storage key.

Figure 8:
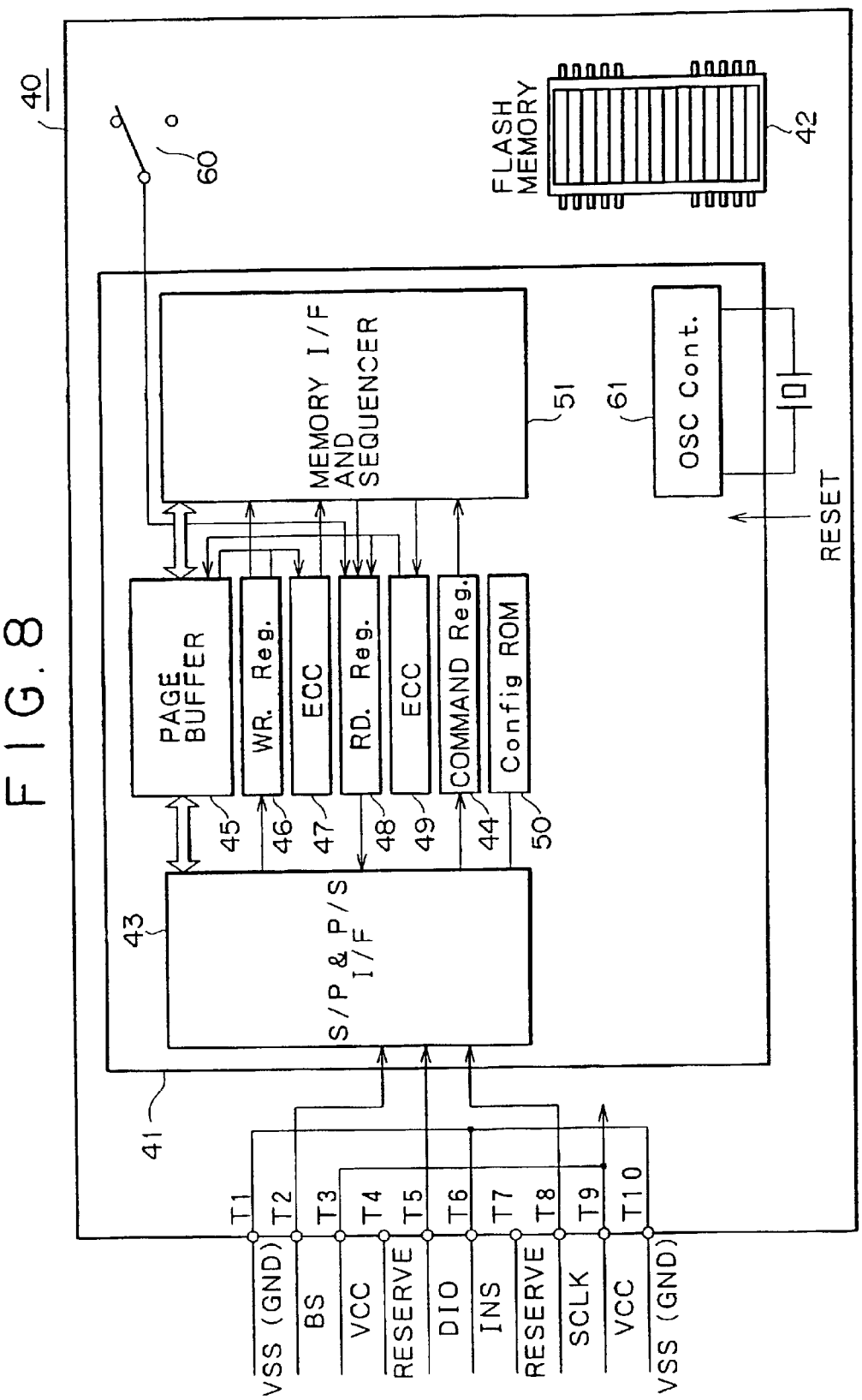
FIG. 8 is a block diagram of the memory card of FIG. 1 where it is not ready for copyright protection.

FIG. 8 shows a memory card 40' which does not have an encryption function (that is, which is not ready for security regarding the copyright). It is to be noted that the components similar to those of the memory card 40 previously described with reference to FIG. 7 are denoted by the same reference numerals and their detailed description will be omitted.

Also the memory card 40' shown is basically similar to the memory card 1 described hereinabove with reference to FIG. 2, and FIG. 8 particularly shows a construction of the memory card 40' which is not ready for copyright protection.

If the memory card 40' shown in FIG. 8 is compared with the memory card 40 described hereinabove with reference to FIG. 7, it is common to the memory card 40 except that it does not include the security block 52 connected to the S/P, P/S and IF block 43.

Further, though not shown, the memory cards 40 and 40' are same also in shape and size (that is, have the shape and the size shown in FIG. 1).

The recorder 101 shown in FIG. 7 is ready for copyright protection, and consequently performs mutual authentication with a memory card, communication of a key for use for encryption processing and so forth.

If the memory card 40' which is not ready for copyright protection is loaded into the recorder 101, then the recorder 101 discriminates that the memory card 40' cannot be used (at least the memory card 40' cannot be used for recording of data which require copyright protection).

Several methods are available for discriminating the type of a memory card.

In one of the available methods, a response condition upon authentication is supervised.

When a memory card is loaded, the recorder 101 (CPU 102) transmits first authentication data to the memory card in order to perform authentication. If the memory card 40' is loaded, then since it does not include the security block 52, the recorder 101 cannot receive a normal response (second authentication data mentioned hereinabove) from the memory card 40'.

Accordingly, if a normal response is not received even if a certain time elapses after transmission of the first authentication data, then the CPU 102 can discriminate that the memory card loaded is not ready for copyright protection.

In another method, identification information representing whether or not a memory card is ready for security is recorded in an area (boot area) of the memory card.

In particular, when a memory card is loaded, the CPU 102 reads identification information of whether or not the memory card is ready for security in data of the boot area read into the recorder 101 first, and based on the identification information, the recorder 101 can discriminate the type of the memory card (40 or 40').

By the way, not only the recorder 101 shown in FIG. 6 but also another apparatus (recorder) which uses the memory card 40' which is not ready for security are available.

For example, such an apparatus as a digital handy movie which has a function of recording an image picked up by a CCD camera into a memory card and reproducing the picked up image from the memory card can use the memory card 40'. Such a digital handy movie or the like as just mentioned is normally incapable of using the memory card 40 which is ready for security.

Further, an IC recorder which performs aural recording into the memory card described above in place of a tape recorder is designed so as to use the memory card 40' because normally the copyright need not be taken into consideration in regard to contents of a conference which are recorded by the IC recorder.

In short, an apparatus whose recording contents are audio data which do not relate to the copyright is constructed so as to use the memory card 40'.

A recorder as an apparatus of the type just described thus has, for example, the construction of FIG. 1 from which the security block 103 is removed.

It is to be noted that, when the recorder of the type just described is used to record audio data or the like into the memory card 40', although encryption processing is not performed, compression processing is performed.

The compression method in this instance may be the ATRAC3 similarly as in the case of the recorder 101 described hereinabove or may be some other compression method such as the ATRAC or the ADPCM.

In short, while data for which ATRAC3 compression processing and encryption processing have been performed are recorded onto the memory card 40, data for which compression processing in accordance with the ATRAC3 or some other method has been performed but no encryption processing has been performed are recorded onto the memory card 40'.

On the other hand, even though a recorder is constructed so as to record audio data similarly, where it is a recorder for music (portable terminal) which compresses a digital audio signal outputted from a digital audio apparatus such as a CD player and records the compressed digital audio signal into a memory card, since it realizes copyright protection, it is constructed so as to use the memory card 40 and execute authentication and encryption.

In this manner, the recorder 101 in the present system is constructed so as to use the memory card 40 from the circumstance regarding whether or not there is the necessity for protection of the copyright. However, since the memory card 40 and the memory card 40' are same in appearance shape and size as described above and cannot be identified readily from each other, it may possibly occur frequently that the memory card 40' is loaded into the recorder 101.

Therefore, in the present system, the memory cards 40 and 40' are constructed so that they can be identified from each other at a glance.

In particular, in the memory card 40 and the memory card 40', the card housings thereof are formed as different ones of transparent, translucent and opaque housings from each other so as to allow the user to identify them from each other.

Various examples of setting of the card housings of the memory card 40 which is ready for copyright protection and the memory card 40' which is not ready for copyright protection are illustrated collectively in FIG. 9.

In the example 1 illustrated in FIG. 9, the card housing of the memory card 40 which is ready for copyright protection is formed as a partially or entirely transparent card housing as shown in FIGS. 1 to 3. On the other hand, the card housing of the memory card 40' which is not ready for copyright protection is formed as a partially or entirely opaque card housing.

Consequently, if the card housing is entirely or partially transparent, then the user can discriminate that the memory card is the memory card 40, but if the card housing is not transparent, then the user can discriminate that the memory card is the memory card 40'.

Also the other examples 2 to 6 similarly allow identification of the card type by the user at a glance.

In the example 2, the card housing of the memory card 40 which is ready for copyright protection is formed as a partially or entirely opaque card housing. Meanwhile, the card housing of the memory card 40' which is not ready for copyright protection is formed as a partially or entirely transparent card housing.

In the example 3, the card housing of the memory card 40 which is ready for copyright protection is formed as a partially or entirely translucent card housing. Meanwhile, the card housing of the memory card 40' which is not ready for copyright protection is formed as a partially or entirely transparent card housing.

In the example 4, the card housing of the memory card 40 which is ready for copyright protection is formed as a partially or entirely transparent card housing. Meanwhile, the card housing of the memory card 40' which is not ready for copyright protection is formed as a partially or entirely translucent card housing.

In the example 5, the card housing of the memory card 40 which is ready for copyright protection is formed as a partially or entirely translucent card housing. Meanwhile, the card housing of the memory card 40' which is not ready for copyright protection is formed as a partially or entirely opaque card housing.

In the example 6, the card housing of the memory card 40 which is ready for copyright protection is formed as a partially or entirely opaque card housing. Meanwhile, the card housing of the memory card 40' which is not ready for copyright protection is formed as a partially or entirely translucent card housing.

Whichever one of the examples 1 to 6 is adopted, the user can recognize at a glance of a memory card whether the memory card is the memory card 40 which is ready for copyright protection or the memory card 40' which is not ready for copyright protection. Accordingly, the user can select a memory card appropriately in accordance with an application or the type of the recorder.

It is to be noted that, while, in the system described above, the card housings are formed as different ones of transparent, translucent and opaque card housings from each other so as to allow identification of the memory cards 40 and 40', various modifications are possible.

For example, easier identification is possible where different colors are used for different card housings together with the settings among transparent, opaque and translucent.

Further, the two types of semiconductor memory cards described hereinabove in connection with the embodiments are not necessarily have such a specific shape as described hereinabove, but the semiconductor memory card of the present invention can be applied as any semiconductor memory card such as, for example, a memory card of the name card size.

Naturally, the internal construction, storage capacity, subject of use, contents of data to be stored and so forth are not limited to those described hereinabove, but can be applied to any memory card.

Further, while identification between two types of memory cards is described above, the present invention can naturally be applied also where three of more types of memory cards of the same shape and the same size are available.

It is to be noted that the present invention can naturally be applied to various memory cards in which a flash memory is incorporated such as the SD card (trademark), the multimedia card (trademark) or the smart media card (trademark).

While preferred embodiments of the present invention have been described using specific terms, such description is for illustrative purposes only, and it is to be understood that changes and variations may be made without departing from the spirit or scope of the following claims.

What is claimed is:

1. A semiconductor memory card usable by a user, comprising:

a card housing formed of molded plastic material; and a circuit board arranged in said card housing and having a non-volatile memory mounted thereon;

the entirety of said card housing being molded of said plastic material selected from the group consisting of material that is entirely transparent, and material that is entirely translucent, such that said housing has top and bottom surfaces formed entirely of said plastic material and thereby enable the internal structure of the card to be visually observed from the outside of the card.

2. A semiconductor memory card according to claim 1, wherein the transparent or translucent material is colored.

* * * * *